(12) United States Patent
Oba

(10) Patent No.: US 11,812,004 B2
(45) Date of Patent: Nov. 7, 2023

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Yoshitaka Oba, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/095,570

(22) Filed: Jan. 11, 2023

(65) Prior Publication Data

US 2023/0224424 A1     Jul. 13, 2023

Related U.S. Application Data

(63) Continuation of application No. 17/348,924, filed on Jun. 16, 2021, now Pat. No. 11,582,367.

(30) Foreign Application Priority Data

Jun. 24, 2020     (JP) ................................. 2020-109000

(51) Int. Cl.
  *H04N 1/60*     (2006.01)
  *H04N 1/00*     (2006.01)

(52) U.S. Cl.
  CPC ....... *H04N 1/6044* (2013.01); *H04N 1/00708* (2013.01); *H04N 1/00816* (2013.01); *H04N 1/6027* (2013.01)

(58) Field of Classification Search
  CPC ............ H04N 1/6044; H04N 1/00708; H04N 1/00816; H04N 1/6027; H04N 1/6036; G03G 15/5062
  See application file for complete search history.

(56) References Cited

U.S. PATENT DOCUMENTS

| 7,486,414 | B2* | 2/2009 | Arai ................. G11B 20/10009 |
| | | | 358/1.9 |
| 9,733,602 | B2 | 8/2017 | Oki |
| 10,338,863 | B1* | 7/2019 | Wang ................... H04N 1/6036 |
| 10,484,555 | B2* | 11/2019 | Itagaki ............... G03G 15/0887 |

(Continued)

FOREIGN PATENT DOCUMENTS

JP     2017-32922 A     2/2017

*Primary Examiner* — Ted W Barnes
(74) *Attorney, Agent, or Firm* — VENABLE LLP

(57) ABSTRACT

A printing apparatus causes a printer engine to print first tone correction patches of a first color on a first sheet and to print second tone correction patches of a second color being different from the first color on a second sheet, generate correction information based on a color measurement result of the first tone correction patches and the second tone correction patches printed on the first sheet and the second sheet, respectively, as measured by a sensor, and correct image data using the correction information. In the generation of the correction information, in a case where there are more than a predetermined number of sheets of a size being different from a predetermined size between the first sheet and the second sheet, the correction information using the color measurement result of the first tone correction patches and the second tone correction patches is not generated.

17 Claims, 16 Drawing Sheets

(56) References Cited

U.S. PATENT DOCUMENTS

| | | | |
|---|---|---|---|
| 2004/0096231 A1* | 5/2004 | Furno | H04N 1/6036 399/49 |
| 2005/0018219 A1* | 1/2005 | Senn | H04N 1/6044 358/1.9 |
| 2006/0126137 A1* | 6/2006 | Coons | G03G 15/5062 358/504 |
| 2007/0019026 A1* | 1/2007 | Gibson | G03G 15/55 347/19 |
| 2011/0286018 A1* | 11/2011 | Hashizume | H04N 1/6033 358/1.9 |
| 2012/0050771 A1* | 3/2012 | Sakatani | H04N 1/00015 358/1.9 |
| 2012/0206746 A1* | 8/2012 | Sakatani | H04N 1/00023 358/1.9 |
| 2013/0155426 A1* | 6/2013 | Achiwa | G06K 15/1867 358/1.9 |
| 2013/0216244 A1* | 8/2013 | Miyazaki | G03G 15/5062 399/15 |
| 2013/0242361 A1* | 9/2013 | Matsumoto | G01J 3/0262 358/504 |
| 2013/0342861 A1* | 12/2013 | Sato | G06K 15/1878 358/1.9 |
| 2013/0343774 A1* | 12/2013 | Ikeda | G03G 15/5033 399/49 |
| 2014/0139883 A1* | 5/2014 | Hashizume | H04N 1/00023 358/3.06 |
| 2014/0253931 A1* | 9/2014 | Hashizume | H04N 1/4078 358/1.9 |
| 2015/0124272 A1* | 5/2015 | Hashizume | H04N 1/50 358/1.9 |
| 2015/0350484 A1* | 12/2015 | Suzuki | H04N 1/2338 358/474 |
| 2015/0356387 A1* | 12/2015 | Hirano | G06K 15/1878 358/1.9 |
| 2016/0269598 A1* | 9/2016 | Hayashi | H04N 1/00087 |
| 2017/0013166 A1* | 1/2017 | Katsuyama | G06K 15/102 |
| 2017/0038717 A1* | 2/2017 | Oki | G03G 15/50 |
| 2017/0064114 A1* | 3/2017 | Fujii | H04N 1/00724 |
| 2017/0094125 A1* | 3/2017 | Yamamoto | H04N 1/6033 |
| 2017/0168441 A1* | 6/2017 | Yamashita | G03G 15/5062 |
| 2018/0220038 A1* | 8/2018 | Sakata | G03G 15/5062 |
| 2018/0268269 A1* | 9/2018 | Sagimori | G06K 15/027 |
| 2019/0045068 A1* | 2/2019 | Tanaka | H04N 1/00076 |
| 2019/0149700 A1* | 5/2019 | Tomii | G03G 15/5062 399/49 |
| 2021/0297559 A1* | 9/2021 | Kashiwagi | H04N 1/6008 |
| 2022/0060605 A1* | 2/2022 | Miwa | H04N 1/00602 |

* cited by examiner

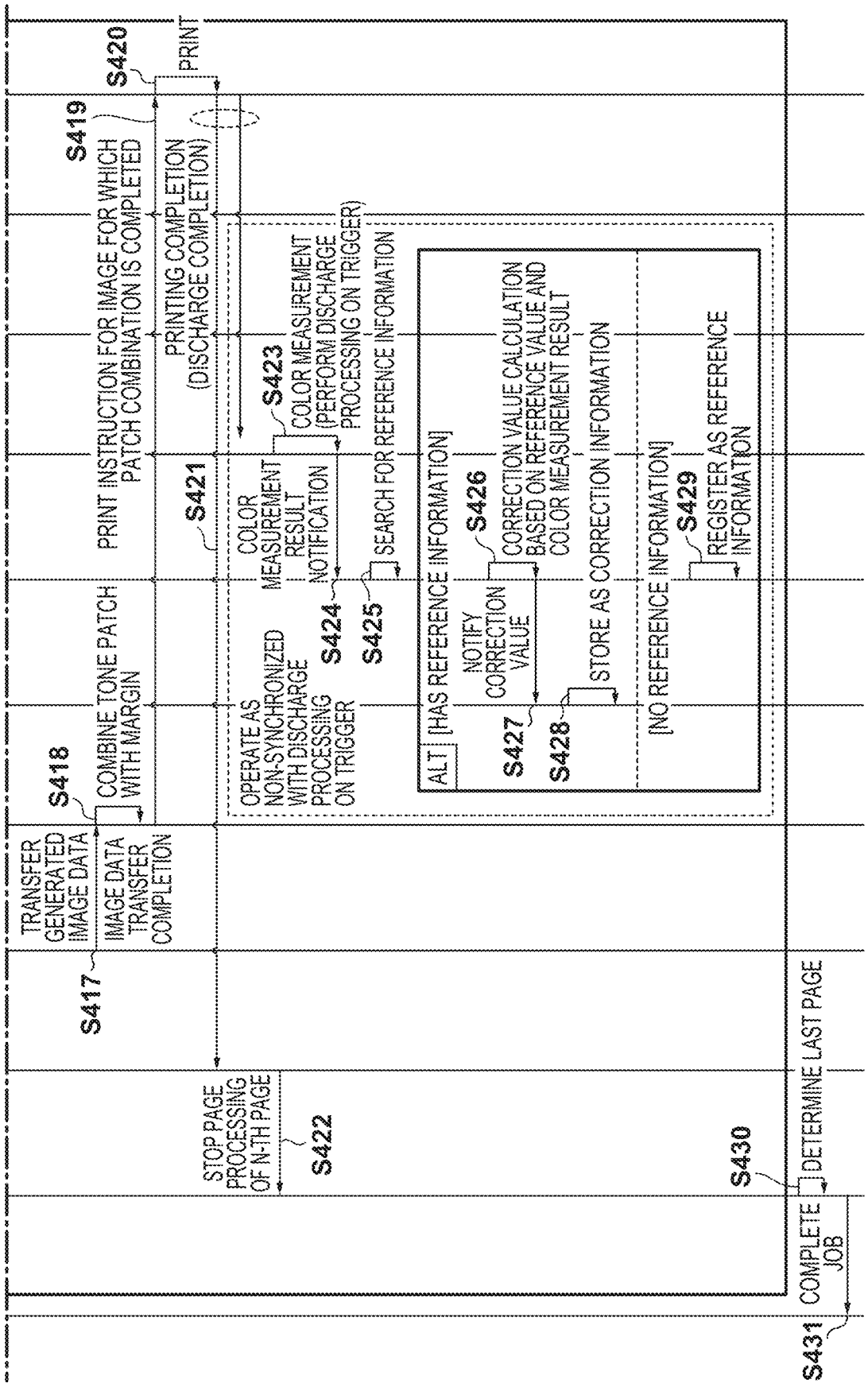

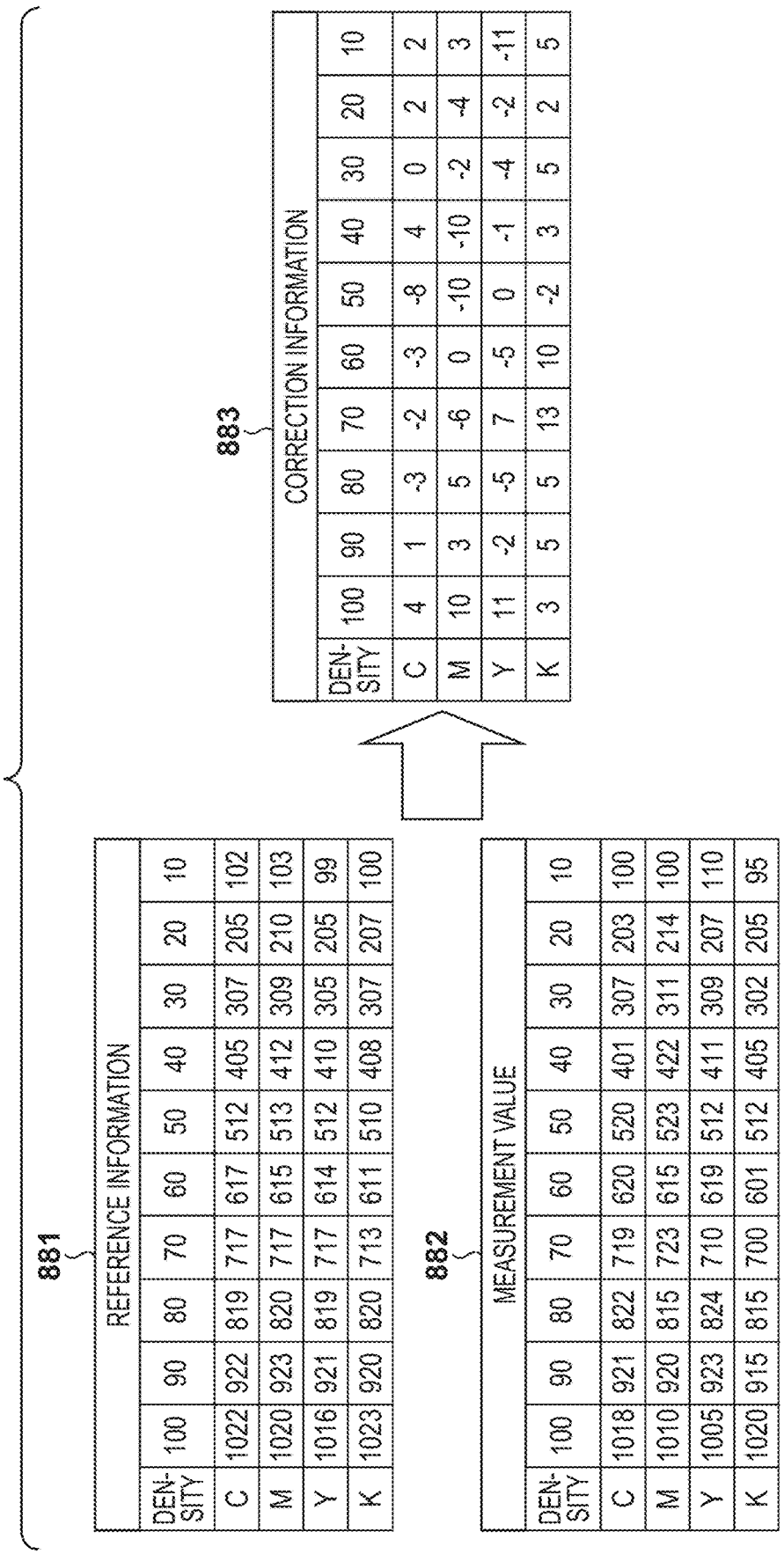

FIG. 8BB

| | 891 | 892 | 893 | 894 | 895 | 896 |
|---|---|---|---|---|---|---|
| | SHEET TYPE | TARGET SHEET FEEDER | REFERENCE INFORMATION (1/2 SPEED) | REFERENCE INFORMATION (1/1 SPEED) | GENERATED PAGE ID | START DATE AND TIME |
| | PLAIN PAPER 3 | CST1 | NULL | YES TBL 881 | 60014 | 2019/07/18 10:04:06 |
| | COATED PAPER 1 | CST4 | NULL | NULL | NULL | NULL |

FIG. 8BC

| | 897 | | | | | |
|---|---|---|---|---|---|---|
| SHEET TYPE | TARGET SHEET FEEDER | CORRECTION INFORMATION (1/2 SPEED) | CORRECTION INFORMATION (1/1 SPEED) | GENERATED PAGE ID | START DATE AND TIME |
| PLAIN PAPER 3 | CST1 | NULL | YES TBL 883 | 640015 | 2019/07/18 18:34:21 |
| COATED PAPER 1 | CST4 | NULL | NULL | NULL | NULL |

FIG. 9

| SHEET SIZE | FEEDING DIRECTION (mm) | WIDTH DIRECTION (mm) | SIZE |
|---|---|---|---|
| A3 | 420.0 | 297.0 | LARGE |
| B4 | 364.0 | 257.0 | LARGE |
| A4R | 297.0 | 210.0 | LARGE |
| A4 | 210.0 | 297.0 | SMALL |
| B5R | 257.0 | 182.0 | LARGE |
| B5 | 182.0 | 257.0 | SMALL |
| A5R | 210.0 | 148.0 | SMALL |
| 11x17 | 431.8 | 279.4 | LARGE |
| LGL | 355.6 | 215.9 | LARGE |
| LTR | 215.9 | 279.4 | SMALL |
| LTRR | 279.4 | 215.9 | LARGE |
| STMTR | 215.9 | 139.7 | SMALL |
| SRA3 | 450.0 | 320.0 | LARGE |
| 12x18 | 457.2 | 304.8 | LARGE |
| EXEC | 184.1 | 266.7 | SMALL |
| EXEC-R | 266.7 | 184.1 | LARGE |
| 13x19 | 482.6 | 330.2 | LARGE |

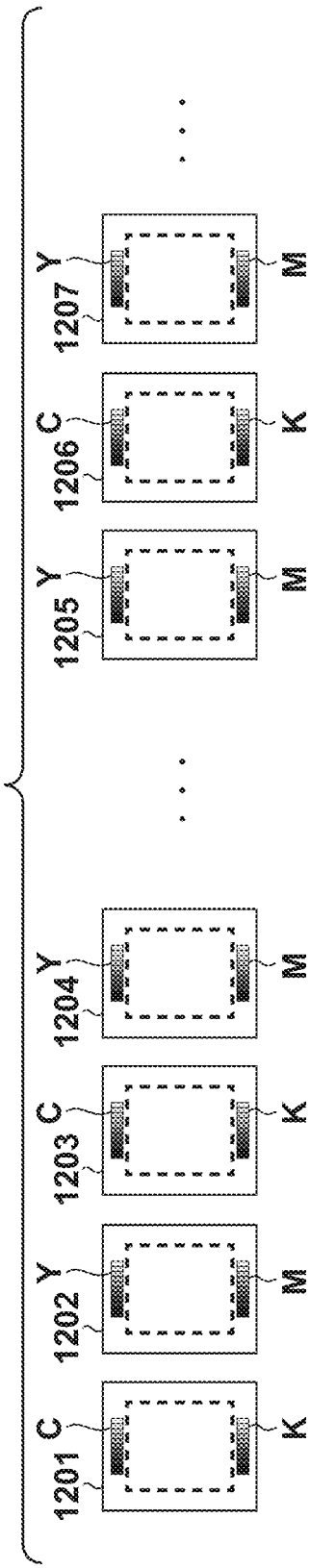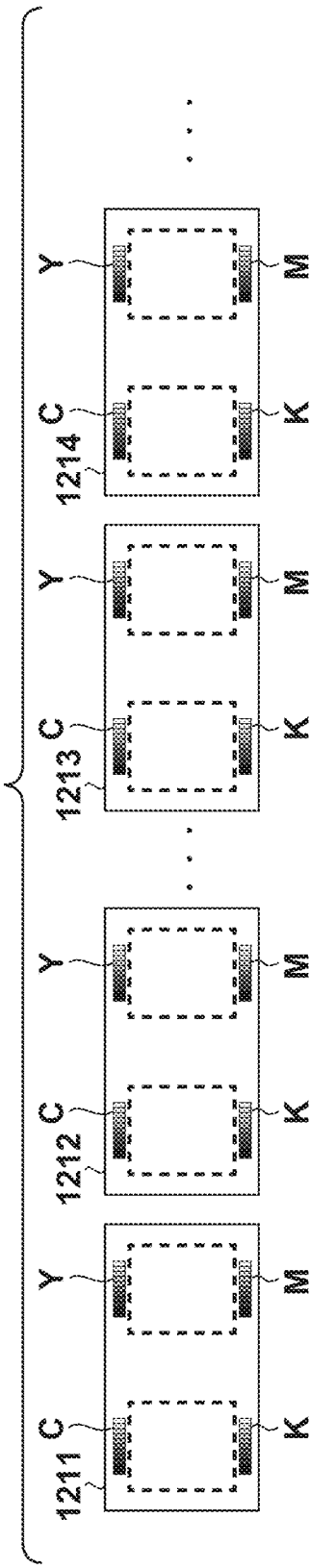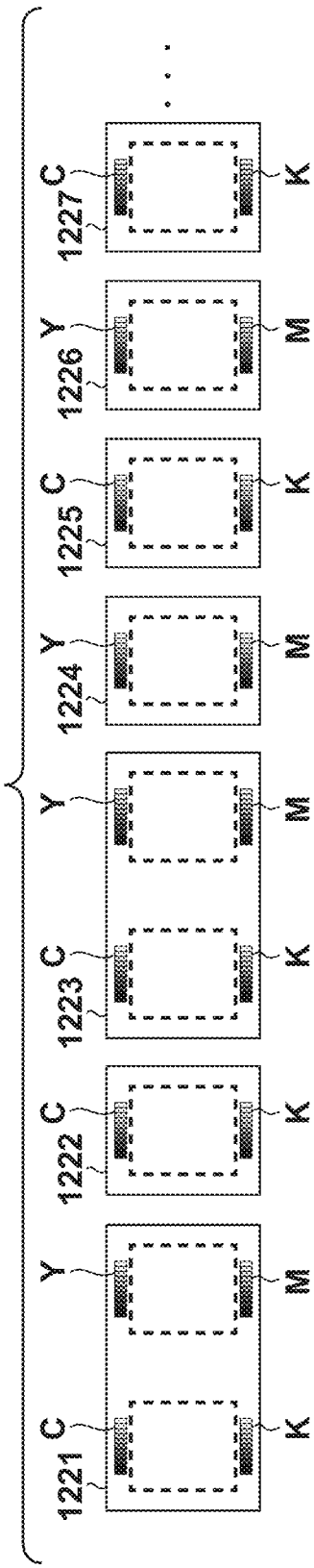

PRINTING APPARATUS, METHOD OF CONTROLLING THE SAME, AND STORAGE MEDIUM

This application is a continuation of application Ser. No. 17/348,924, filed Jun. 16, 2021.

BACKGROUND OF THE INVENTION

Field of the Invention

The present invention relates to a printing apparatus, a method of controlling the same, and a storage medium.

Description of the Related Art

A known image forming apparatus renders page description language (PDL) data sent via a network from an information processing terminal or an image control apparatus into a bitmap and forms an image on a sheet according to the rendered image data.

Also, in a known printing system, an inline sensor is connected to the downstream side of an image forming apparatus that forms an image on a sheet, and the inline sensor reads the image formed on the sheet by the image forming apparatus. In such a printing system, the inline sensor reads a patch printed in the margin area of the print matter by the image forming apparatus for adjusting the image forming position and the image quality. This allows feedback relating to an adjustment result of the image forming apparatus to be given to the image forming apparatus in real time.

However, because a region of the margin area of the print matter is limited, patches needed for adjusting may be unable to be accurately printed by the image forming apparatus. In Japanese Patent Laid-Open No. 2017-32922, a technology is described that, in a case where patches for adjusting an image forming position and patches for adjusting an image quality are printed on one sheet at the same time but overlap one another, reduces the number of gradations in the patches for adjusting the image quality and performs printing such that the patches do not overlap.

Consider a case where a sheet of a size that can accommodate a region for forming the necessary patches and a sheet of a size that cannot accommodate the region are both present. In the method described in Japanese Patent Laid-Open No. 2017-32922, patches with a reduced number of gradations are printed on the sheet with a size that cannot accommodate the region.

However, with the known technology described above, because the patches printed have a reduced number of gradations, the adjustment accuracy of the image quality is reduced.

SUMMARY OF THE INVENTION

An aspect of the present invention is to eliminate the above-mentioned problem with conventional technology.

A feature of the present invention is to provide a technique for performing accurate image quality adjustment in which tone correction patches are printed on a sheet in real time, even in a case of a combination including a sheet with a size able to accommodate the patches on a single sheet and a sheet that is unable to accommodate the patches on a single sheet.

According to a first aspect of the present invention, there is a printing apparatus comprising: a printer engine that prints an image on a sheet; a sensor that performs color measuring of tone correction patches printed on a sheet, the patches including at least a set of first color tone correction patches and a set of second color tone correction patches; a controller including at least one processor and at least one memory being configured to cause the printing apparatus to: correct image data for printing on the basis of a color measurement result obtained by the sensor; control to cause, in a case where the tone correction patches are to be printed on sheets respectively having a predetermined size, the printer engine to print the set of the first color tone correction patches on a first sheet with the predetermined size and to print the set of the second color tone correction patches on a second sheet with the predetermined size; and execute control such that, in a case where the first sheet and the second sheet with the predetermined size are printed one after another, a color measurement result of the tone correction patches printed on the first sheet and the second sheet are used in correcting the image data for printing.

According to a second aspect of the present invention, there is provided a method of controlling a printing apparatus including a printer engine that prints an image on a sheet and a sensor that performs color measuring of tone correction patches printed on a sheet, the patches including at least a set of first color tone correction patches and a set of second color tone correction patches, the method comprising: correcting image data for printing on the basis of a color measurement result obtained by the sensor; controlling to cause, in a case where the tone correction patches are to be printed on sheets respectively having a predetermined size, the printer engine to print the set of the first color tone correction patches on a first sheet with the predetermined size and to print the set of the second color tone correction patches on a second sheet with the predetermined size; and executing control such that, in a case where the first sheet and the second sheet with the predetermined size are printed one after another, a color measurement result of the tone correction patches printed on the first sheet and the second sheet are used in correcting the image data for printing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are diagrams for describing the basic operation sequence when margin-use type printing processing is executed using the printing apparatus according to the embodiment.

FIGS. 8BA, 8BB, and 8BC are diagrams for describing information of a management table of the printing apparatus according to the embodiment.

FIG. 9 is a diagram illustrating an example of a table indicating whether the sheet is a large size sheet or a small size sheet.

FIGS. 12A to 12C are diagrams illustrating examples of sheets on which patches for real time multi-tone correction have been printed.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
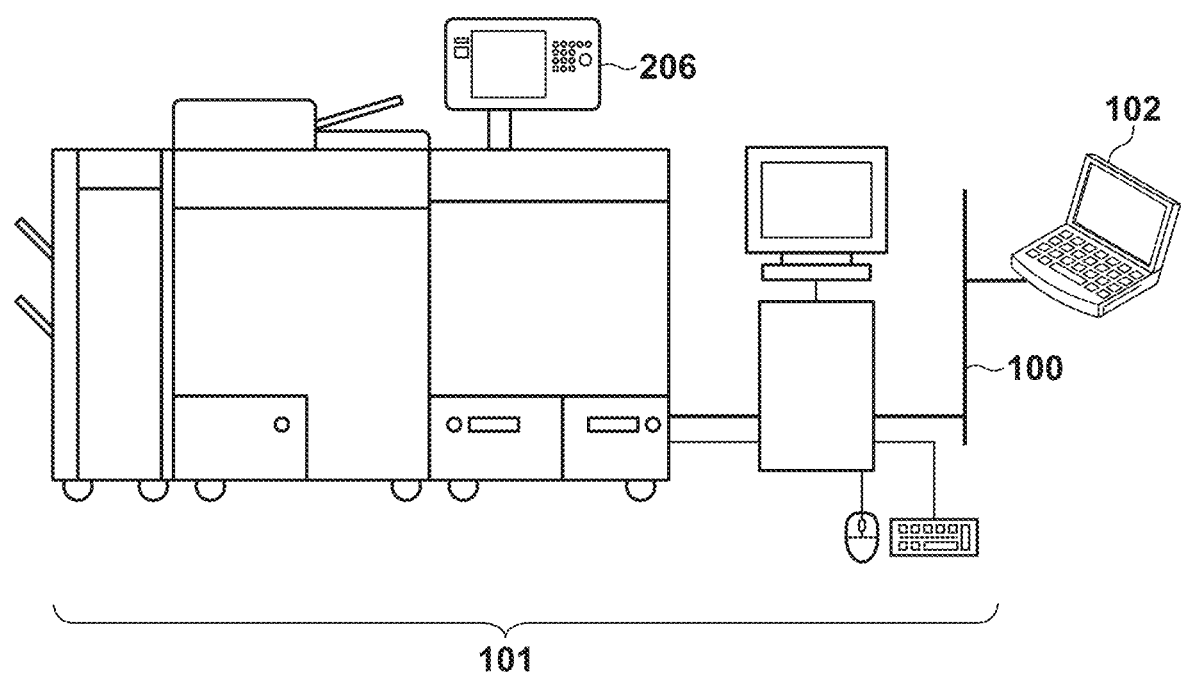
FIG. 1 is a schematic diagram illustrating the overall configuration of a printing system according to an embodiment of the present invention.

FIG. 1 is a schematic diagram illustrating the overall configuration of a printing system according to an embodiment of the present invention.

In the printing system, a printing apparatus 101 and an information processing terminal 102 are connected to one another via a local area network (LAN) cable 100. The printing apparatus 101 is capable of executing a print job received from the information processing terminal 102.

Figure 2:
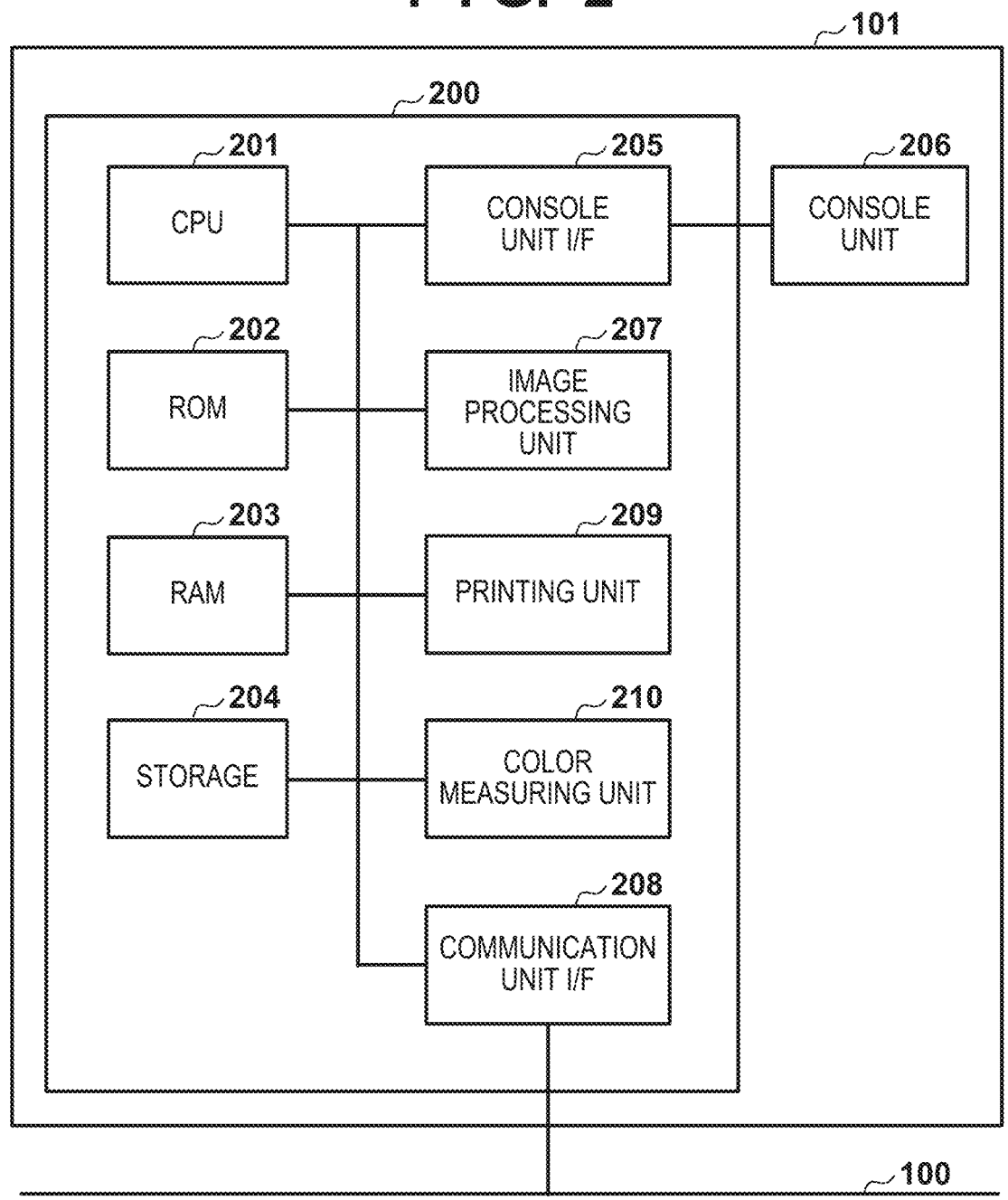
FIG. 2 is a block diagram for describing the hardware configuration of a printing apparatus according to the embodiment.

FIG. 2 is a block diagram for describing the hardware configuration of the printing apparatus 101 according to the embodiment.

The printing apparatus 101 includes a print function for printing an image on a sheet (paper). This embodiment is described using the printing apparatus 101 as an example. However, a multi-function peripheral (MFP) or similar printing apparatus that includes a printing apparatus, a scanner, and a fax function may be used. Also, the printing apparatus may be divided into an image control apparatus (printer driver) and an image output apparatus (printer), with the image output apparatus and the image control apparatus being connected via a video cable and a LAN cable. Also, the printing apparatus may be divided into an image control apparatus and an image output apparatus, with the image output apparatus and the image control apparatus being connected via only a LAN cable.

A control unit 200 including a central processing unit (CPU) 201 controls the entire operations of the printing apparatus 101. The CPU 201 deploys a program stored in a read-only memory (ROM) 202 or a storage 204 into a random-access memory (RAM) 203, executes the deployed program, and executes various controls including print control and read control. The ROM 202 stores control programs, boot programs, and the like that are executable by the CPU 201. The RAM 203 is a main storage memory of the CPU 201 and is used as a working area or temporary storage region to deploy various control programs. The storage 204 stores print data, image data, various programs, and various settings information. In this embodiment, the storage 204 is expected to be an auxiliary storage apparatus such as a hard disk drive (HDD) or the like. However, a non-volatile memory such as a solid state drive (SSD) or the like may be used. Note that in the printing apparatus 101 according to the embodiment, one CPU 201 uses one memory (the RAM 203) to execute the processing described in the flowchart described below. However, other configurations may be used. For example, a plurality of CPUs, RAMs, ROMs, and storages may cooperate to execute the processing described in the flowchart described below. Also, parts of the processing may be executed using a hardware circuit, such as an Application Specific Integrated Circuit (ASIC), a Field-Programmable Gate Array (FPGA), and the like.

A console unit interface (I/F) 205 connects a console unit 206 to the control unit 200. The console unit 206 is provided with a display unit with touch panel functionality, various hard keys, or the like and functions as a display unit that displays information and a reception unit that receives user instructions. An image processing unit 207 is provided with a raster image processor (RIP) function that renders data in a print job received via a communication unit I/F 208 into image data to be printed. Also, the image processing unit 207 is capable of executing resolution conversion or correction processing of the image data obtained by rendering the data of the print job. Note that in this embodiment, the image processing unit 207 is expected to be implemented with a hardware circuit (ASIC, FPGA, or the like). However, no such limitation is intended. For example, the printing apparatus 101 may further include a processor for image processing, and image processing and processing for rendering into image data may be executed by this processor executing an image processing program. In this case, this processor and the CPU 201 cooperate to implement processing as shown in the flowcharts described below. Furthermore, a configuration is possible in which the CPU 201 executes a program for executing image processing to execute image processing and rendering processing. Also, these configurations may be combined to execute image processing.

A printing unit (printer engine) 209 prints an image on a sheet feed from a feeding cassette (not illustrated) on the basis of image data generated by the image processing unit 207. Note that the printing method of the printing unit 209 may be an electro-photographic method or an inkjet method. Another printing method such as a thermal transfer method may be used. A color measuring unit 210 uses a CIS color sensor to measure, at a position downstream of the sheet conveyance path of the printing unit 209, the colors of the tone patches of each color of a tone correction mark formed on the printed sheet and obtains color measurement data. The control unit 200 connects to the LAN 100 via the communication unit I/F 208. The communication unit I/F 208 receives a print request (print job) from the information processing terminal 102 on the LAN 100. Note that in this embodiment, the printing system is as illustrated in FIG. 1. However, the present invention is not limited thereto, and it is only required that one or more information processing terminals and a printing apparatus are communicatively connected via a network. Also, the network may be a wireless or a wired network.

Figure 3:
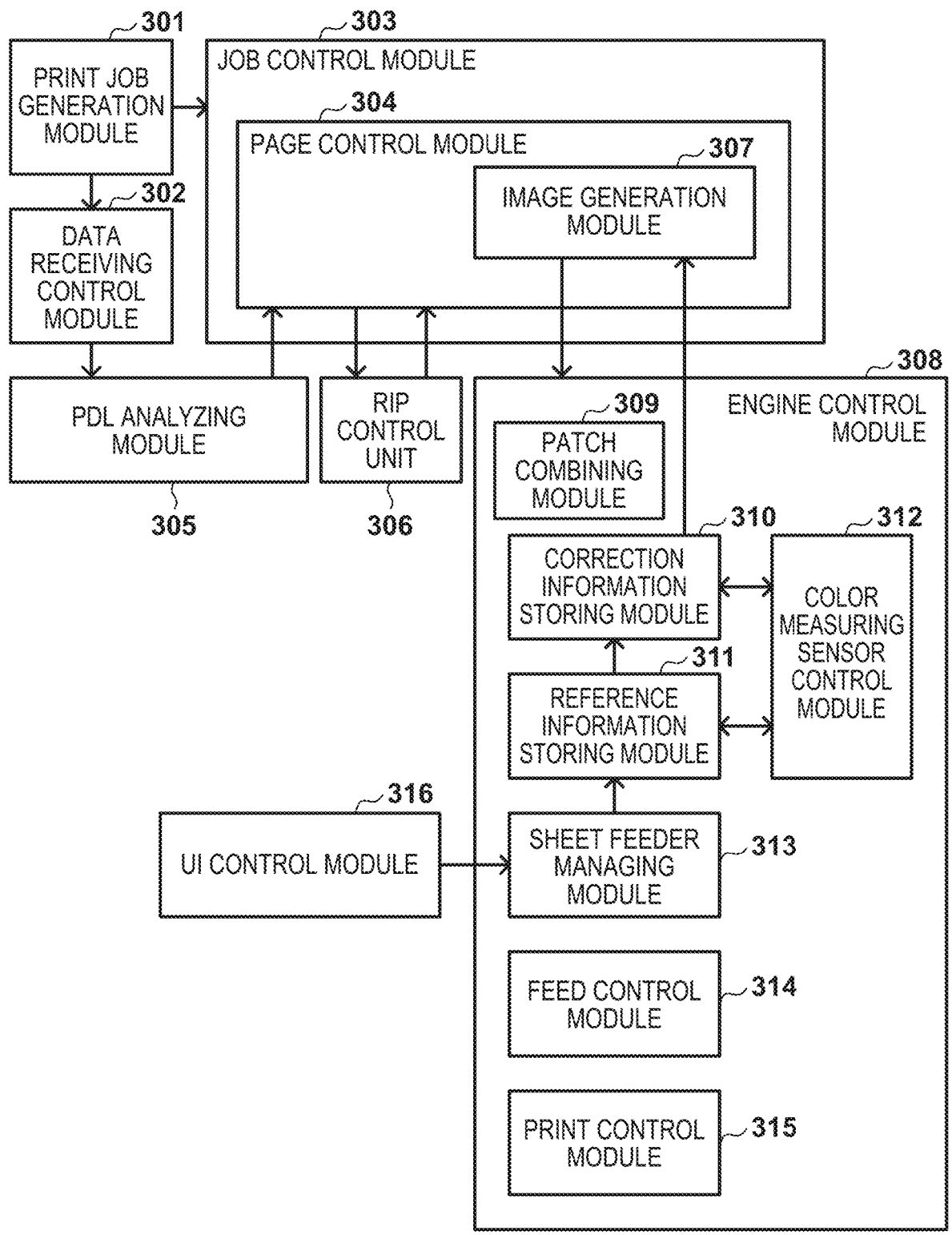
FIG. 3 is a functional block diagram for describing the software configuration of the printing apparatus according to the embodiment.

FIG. 3 is a functional block diagram for describing the software configuration of the printing apparatus 101 according to the embodiment. Note that the functions of the units illustrated in FIG. 3 are implemented by the CPU 201 executing a program deployed on the RAM 203.

A print job generation module 301 generates a print job to be executed by the printing apparatus 101 when a job is input and registers the print job in a job control module 303. A data receiving control module 302 receives PDL data transmitted from the information processing terminal 102 via the communication unit I/F 208. The job control module 303 instructs a page control module 304 to start processing all of the pages included in the registered print job in order from page 1 and makes the page control module 304 start page processing. Then, when the job control module 303 is notified by the page control module 304 that processing of the next page can be started, the job control module 303 instructs the page control module 304 to start processing the next page, with this process repeating. Also, when the job control module 303 receives a notification from the page control module 304 that processing of all the pages is complete, the print job generation module 301 is notified of job completion. The page control module 304 receives a page processing start notification from the job control module 303 and controls the processing of the pages. A PDL analyzing module 305 analyzes the received PDL data and converts it into intermediate data. A RIP control module 306 rasterizes the intermediate data and converts it into image data in a bitmap format. An image generation module 307 reflects the correction information for the sheet to be used in printing to the generated bitmap image data and generates corrected image data (print image data) for printing. Then, the print image data is transferred to a patch combining module 309 of an engine control module 308. The image generation module 307 controls the image processing unit 207.

The engine control module 308 includes the patch combining module 309, a correction information storing module 310, a reference information storing module 311, a color measuring sensor control module 312, a sheet feeder managing module 313, a feed control module 314, and a print control module 315. The color measuring sensor control module 312 controls the color measuring unit 210. Also, the engine control module 308 controls the patch combining module 309, the correction information storing module 310, the reference information storing module 311, the sheet feeder managing module 313, and the feed control module 314; and the print control module 315 controls the printing unit 209.

The patch combining module 309 combines tone correction mark information (tone patches) with print image data such that tone correction marks (patches) are formed in addition to an image formed on the basis of the corrected print image data received from the image generation module 307. Also, the patch combining module 309 instructs the print control module 315 to print the combined image data. The correction information storing module 310 holds reference information to be held by the reference information storing module 311 and correction information obtained by comparison of the color measurement data obtained by the color measuring sensor control module 312 for each type of sheet set in the sheet feeders. Herein, reference information is a color measurement result, sheet feeder, sheet size, sheet type, and similar information notified of by the color measuring sensor control module 312 described below. Correction information is information calculated from stored reference information and a color measurement result notified by the color measuring sensor control module 312.

The reference information storing module 311 holds reference information generated based on color measurement data obtained by the color measuring sensor control module 312 for each type of sheet set in the sheet feeders. The color measuring sensor control module 312 controls the color measuring unit 210 to measure the tone correction marks formed on the sheet and obtains a color measurement result.

The sheet feeder managing module 313 manages information of the sizes and types of the sheets set in all of the sheet feeders of the printing apparatus 101. Also, the sheet feeder managing module 313 clears the reference information for sheet types to be removed for replacement held in the reference information storing module 311 in response to a sheet registration request from a UI control module 316. Furthermore, in a case where correction information for sheet types to be removed for replacement is held by the correction information storing module 310, the sheet feeder managing module 313 clears this correction information. The feed control module 314 controls the sheet feeders according to a print job and conveys and supplies the sheets housed in the sheet feeders. The print control module 315 prints on a sheet supplied by the feed control module 314 on the basis of image data that has been tone patch combined and discharges the printed sheet. In this embodiment, an image may be formed on a sheet on the basis of image data with tone correction mark information (tone patches) added thereto as appropriate.

When the user operates the console unit 206 and sets sheet information to the sheet feeder, the UI control module 316 requests sheet registration for the sheet feeder managing module 313. Also, UI control module 316 displays information of the registered sheets on the console unit 206. The UI control module 316 controls the console unit 206.

Next, a basic sequence of printing processing for printing color measuring patches for tone correction on a printed sheet, measuring in real time with a color measuring sensor, and continuously giving feedback for the correction information for the next page is provided. Hereafter, this control is referred to as real time multi-tone correction.

There are two types of real time multi-tone correction: a margin-use type in which patches are printed using a margin area of the output sheet and a chart-insertion type in which, in a case where the margin area of the output sheet cannot be used, a dedicated sheet to inserted and patches are printed. With the margin-use type, patches are printed on each page in the margin area of the print data inserted by the user and feedback correction is performed. With the chart-insertion type, a dedicated sheet on which patches have been printed at insertion intervals set in advance in the printing apparatus 101 is inserted and feedback correction is performed. The user instructs the printing apparatus 101 whether to perform real time multi-tone correction using the margin-use type or the chart-insertion type when entering a print job.

Figure 4A:
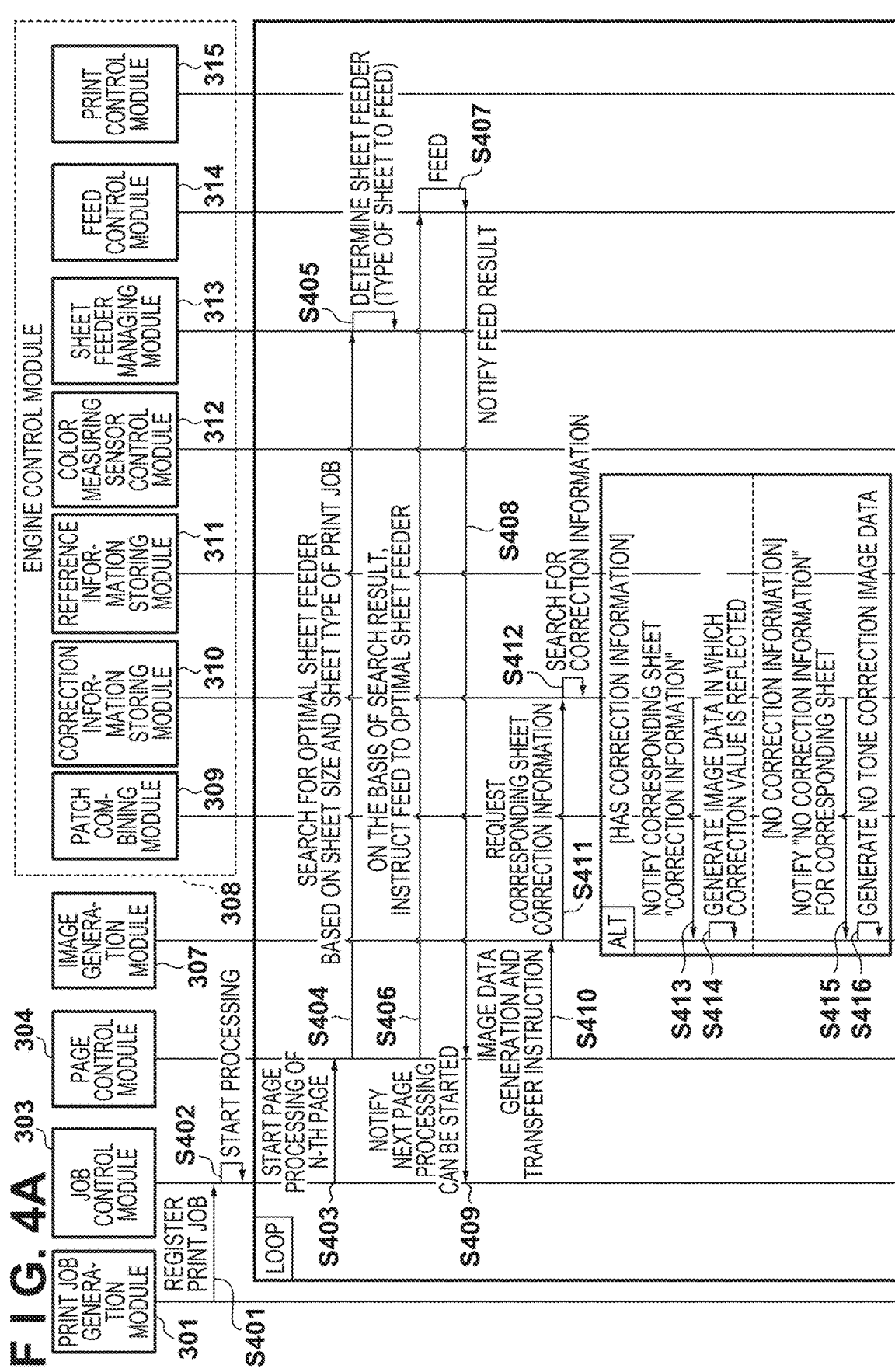

FIGS. 4A and 4B are diagrams for describing the basic operation sequence when margin-use type printing processing is executed using the printing apparatus 101 according to the embodiment. The sequence is implemented by the CPU 201 of the printing apparatus 101 deploying a program stored in the ROM 202 on the RAM 203 and executing the program.

The print job generation module 301 generates a print job according to the job received from the communication unit I/F 208. Then, in step S401, the print job generation module 301 registers the generated print job in the job control module 303. In response to this, in step S402, the job control module 303 determines the execution order of the registered print jobs and starts order processing. When the processing of the job control module 303 starts, in step S403, the job control module 303 notifies the page control module 304 of the start of the processing of the Nth page. When the page control module 304 receives the start notification of the processing of the Nth page from the job control module 303, in step S404, the page control module 304 queries the sheet feeder managing module 313 for which sheet feeder to feed from for the sheet size and sheet type designated for the page. In response to this, in step S405, the sheet feeder managing module 313 determines which sheet feeder to feed from on the basis of the designated sheet size and sheet type and returns the result to the page control module 304.

In step S406, the page control module 304 instructs the feed control module 314 to feed from the sheet feeder determined by the sheet feeder managing module 313. In response to this, in step S407, the feed control module 314 performs feeding from the instructed sheet feeder in accordance with the feeding instruction from the page control module 304. Then, in step S408, the page control module 304 is notified of this feeding result. When a normal feeding result is received from the feed control module 314, in step S409, the page control module 304 notifies the job control module 303 that processing can be started of the next page. Also, when a normal feeding result is received from the feed control module 314, in step S410, the page control module 304 instructs the image generation module 307 to generate image data and to transfer the image data. At this time, the page control module 304 notifies the image generation module 307 of the sheet feeder used, sheet size, and sheet type.

When the image generation module 307 receives an instruction to generate image data and to transfer the image data, in step S411, the image generation module 307 requests correction information for the correction information storing module 310 on the basis of the notified sheet information. In response to this, in step S412, the correction information storing module 310 searches for whether the correction information corresponding to the information passed on is stored in the RAM 203. Then, when the correction information storing module 310 detects the corresponding correction information, in step S413, the correction information storing module 310 notifies the image generation module 307 of the correction information. In response to this, in step S414, the image generation module 307 uses the correction information from the correction information storing module 310 to generate image data to be printed.

On the other hand, in a case where the correction information storing module 310 cannot detect correction information corresponding to the information passed on from the image generation module 307, in step S415, the correction information storing module 310 informs the image generation module 307 that there is no correction information. In a case where there is no correction information, in step S416, the image generation module 307 generates image data without correction information. Then, in step S417, the image generation module 307 transfers to the patch combining module 309 the generated image data and the sheet feeder, sheet size, and sheet type information notified of by the page control module 304.

In step S418, the patch combining module 309 combines tone adjustment mark information (tone patches) with a margin area of the image data transferred by the image generation module 307. Next, in step S419, the patch combining module 309 transmits, to the print control module 315, the generated combined image data and the sheet feeder, sheet size, and sheet type information notified of by the image generation module 307 and issues a print instruction. Then, in step S420, the print control module 315 prints the received image data (the image data combined with the tone adjustment mark information) on a sheet supplied by the feed control module 314. When printing is complete, in step S421, the print control module 315 notifies the page control module 304 and the color measuring sensor control module 312 of printing completion (discharge completion). The notification of printing completion (discharge completion) includes the sheet feeder, sheet size, and sheet type information. When the printing completion (discharge completion) notification is received from the print control module 315, in step S422, the page control module 304 notifies the job control module 303 of the completion of the processing of the Nth page.

On the other hand, when the printing completion (discharge completion) notification is received from the print control module 315, in step S423, the color measuring sensor control module 312 performs color measuring of the tone adjustment marks (tone patches) printed in step S420. Then, in step S424, the reference information storing module 311 is notified of information of the color measurement result and the sheet feeder, sheet size, and sheet type information notified of by the print control module 315 associated with one another.

In step S425, the reference information storing module 311 searches for whether reference information corresponding to the information notified of by the color measuring sensor control module 312 is stored in the RAM 203. Then, in a case where the reference information corresponding to the notified information is stored, in step S426, correction information is calculated from the stored reference information and the color measurement result notified by the color measuring sensor control module 312. Next, in step S427, the reference information storing module 311 notifies the correction information storing module 310 of the calculated correction information. Then, in step S428, the correction information storing module 310 stores the contents (correction information) notified by the reference information storing module 311 as correction information. On the other hand, in step S425, in a case the reference information is not stored, in step S429, the reference information storing module 311 stores the information (color measurement result, sheet feeder, sheet size, sheet type, and the like) notified by the color measuring sensor control module 312 in the RAM 203 as reference information (initial information).

Note that in this embodiment, the processing from step S403 to step S425 is indicated by "LOOP" meaning that this processing is repeatedly executed on all of the pages of the print job registered in the job control module 303. The start processing on each page indicated in step S403 can be issued when the notification of step S409 indicating that processing of the next page can start is received.

When the job control module 303 receives processing completion of the Nth page, in step S430, the job control module 303 determines whether or not the Nth page is the last page of the print job. Then, when the job control module 303 determines that the completion of the last page has been received, in step S431, the print job generation module 301 is notified of job completion.

Figure 5:
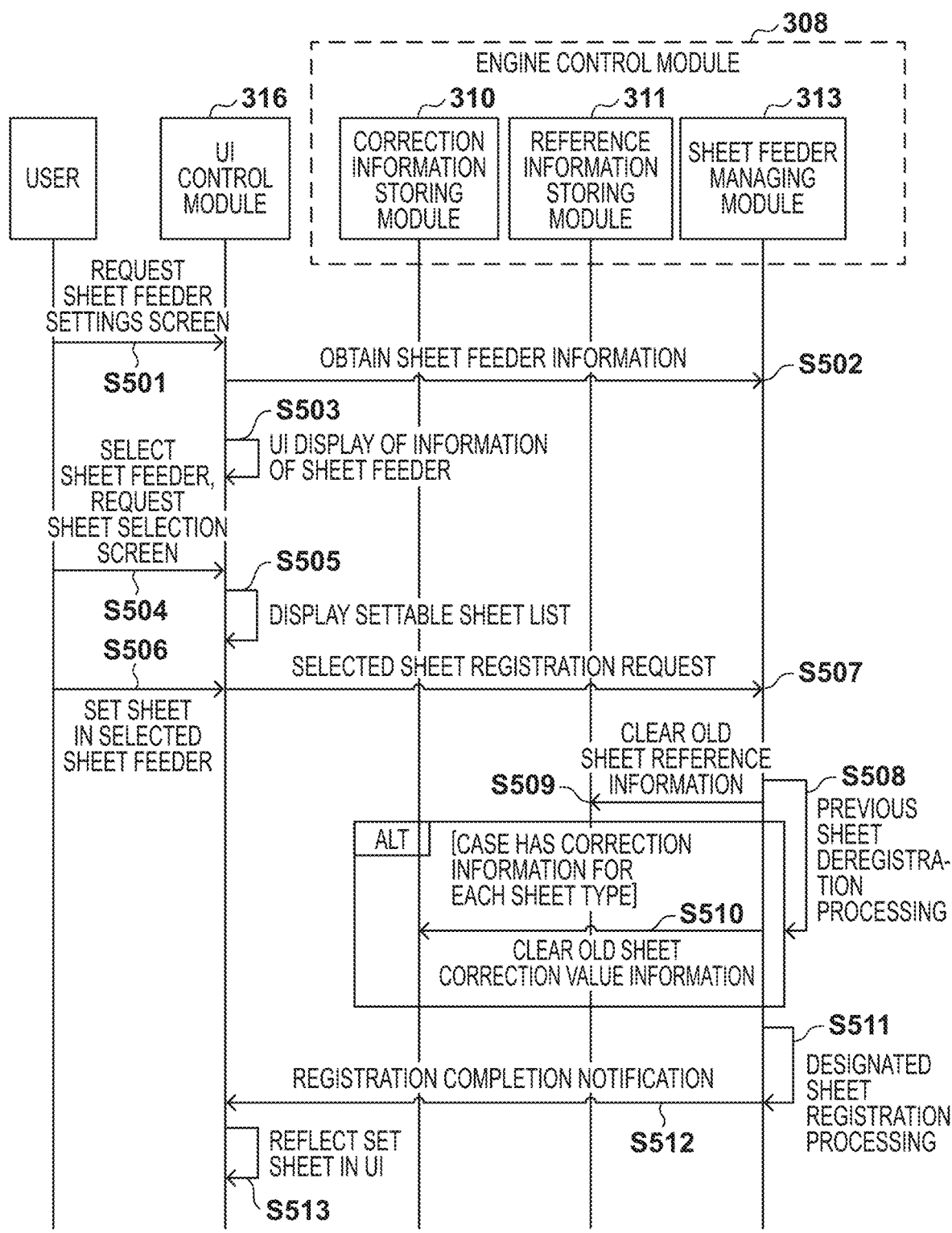
FIG. 5 is a diagram for describing the process of clearing the reference information and the correction information in the printing apparatus according to the embodiment.

FIG. 5 is a diagram for describing the process of clearing the reference information and the correction information in the printing apparatus 101 according to this embodiment. The processing indicated by this process is implemented by the CPU 201 of the printing apparatus 101 deploying a program stored in the ROM 202 on the RAM 203 and executing the program.

When the printing apparatus 101 prints an image on a sheet, because the characteristics for printing an image differs depending on the type of sheet, the printing apparatus 101 needs to hold reference information for each type of sheet for tone correction to be correctly performed. The printing apparatus 101 is capable of using many types of sheets. However, the sheets actually used need to be set in the sheet feeder. Thus, the reference information storing module 311 holds only the reference information of the type of sheet set in the sheet feeder. Accordingly, when the user sets a new type of sheet in the sheet feeder of the printing apparatus 101, the reference information and the correction information corresponding to the type of sheet being removed for replacement must be cleared.

In step S501, the user operates a UI screen displayed on the console unit 206 of the printing apparatus 101 and selects the feeder settings screen. In step S502, when the UI control module 316 of the printing apparatus 101 receives a user operation, the UI control module 316 obtains the information of the size and type of all of the sheets set in the sheet feeders of the printing apparatus 101 from the sheet feeder managing module 313. Then, in step S503, the UI control module 316 displays the information obtained in step S502 on the UI screen of the console unit 206.

Figure 7A:
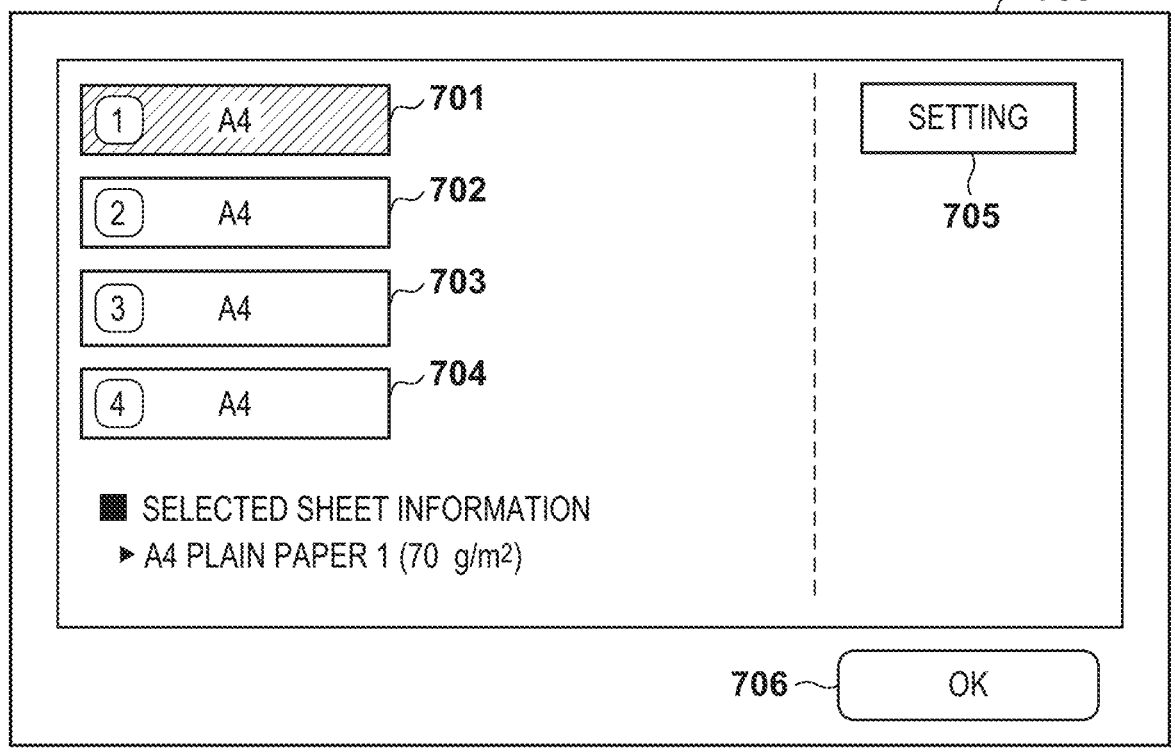
FIGS. 7A and 7B depict views illustrating examples of screens for registering sheet types with sheet feeders of the printing apparatus according to the embodiment.

FIG. 7A depicts a view illustrating an example of a UI screen 700 displayed at this time.

In step S504, the user selects the sheet feeder with the sheet they wish to change via the UI screen 700. In FIG. 7A, selection buttons 701 to 704 correspond to the sheet feeders of the printing apparatus 101. In step S505, when a user operation is received, the UI control module 316 of the printing apparatus 101 displays, on the UI screen, a list of the type of sheets able to be set in the sheet feeder corresponding to the selected selection button. In FIG. 7A, the selection button 701 is selected.

Figure 7B:
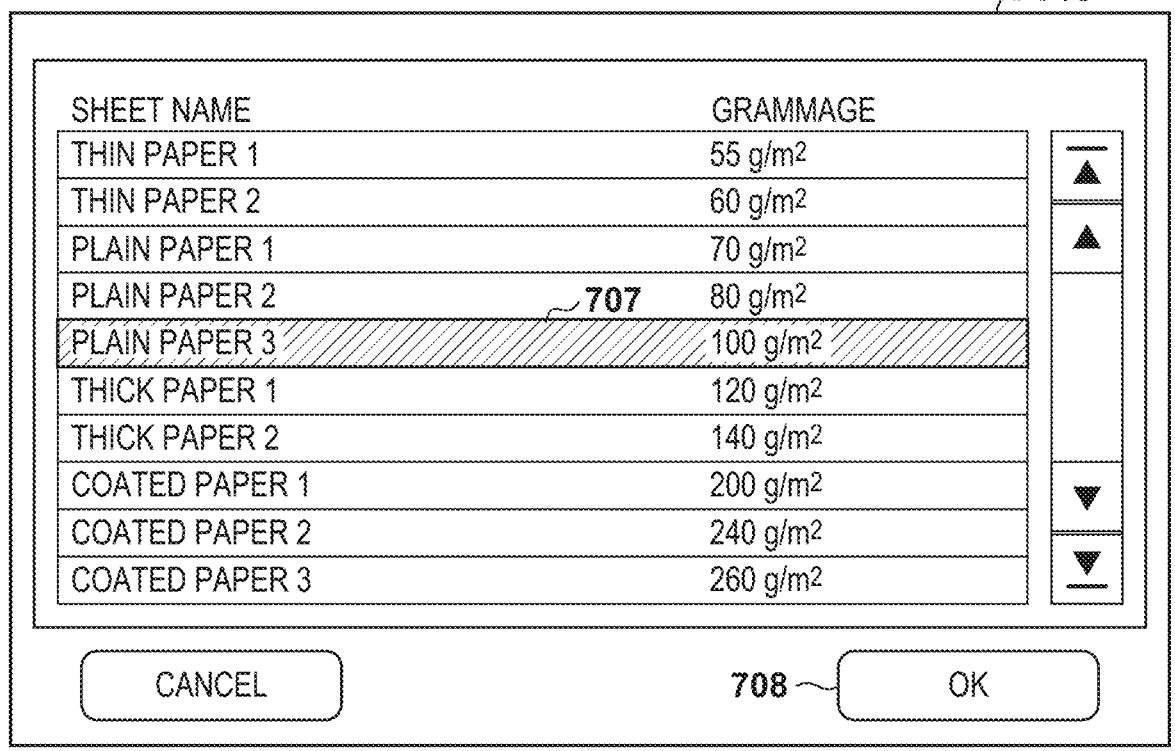

FIG. 7B depicts a view illustrating a display example of a list 710 of the type of sheets able to be set in the sheet feeder corresponding to the selection button.

In step S506, the user selects the type of sheet they wish to change from the list 710 of sheet types. In step S507, when a user operation is received, the UI control module 316 of the printing apparatus 101 requests the sheet feeder managing module 313 to register the sheet feeder selected by the user and the sheet type. In the example of FIG. 7B, the request is to change the sheet of the sheet feeder corresponding to the selection button 701 to "plain paper 3" indicated by reference number 707. Accordingly, in step S508, the sheet feeder managing module 313 updates the information stored in the reference information storing module 311 and the correction information storing module 310. The update processing will be described in detail below with reference FIGS. 6A and 6B. Note that the screens of FIGS. 7A and 7B will be described in further detail below with reference to the sequence of FIG. 5.

Figure 6A:
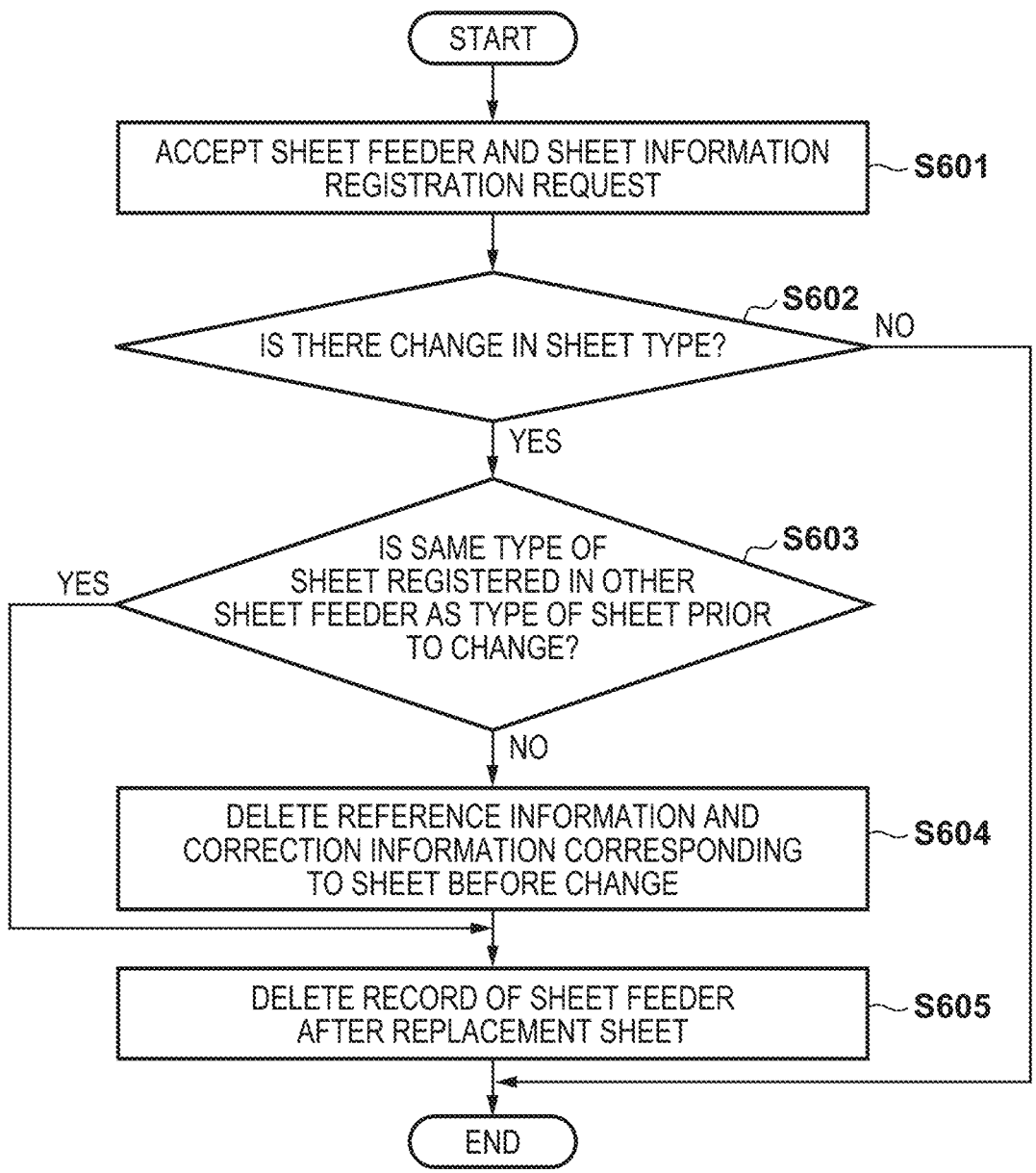
FIG. 6A is a flowchart for describing the processing to clear the reference information and the correction information for each sheet type executed by the printing apparatus according to the embodiment.

When the sheet feeder managing module 313 determines that it is necessary to clear the reference information and the correction information on the basis of the flowchart of FIG. 6A, processing to clear the reference information and the correction information, step S509 and step S510 respectively, is executed. In step S509, the sheet feeder managing module 313 clears the reference information for the type of sheet to be removed for replacement stored in the reference information storing module 311. Also, in step S510, the sheet feeder managing module 313 determines whether correction information for the type of sheet to be removed for replacement is present in the correction information storing module 310 and, in a case where it is present, clears the correction information. Then, when the processing series of step S508 is complete, in step S511, the sheet feeder managing module 313 executes processing to register the type of sheet designated by the user (updates the information of the sheet set in the selected sheet feeder). In step S512, the sheet feeder managing module 313 notifies the UI control module 316 of registration completion. In step S513, the UI control module 316 updates the UI screen with the information of the type of sheet for which registration has been completed.

Figure 6B:
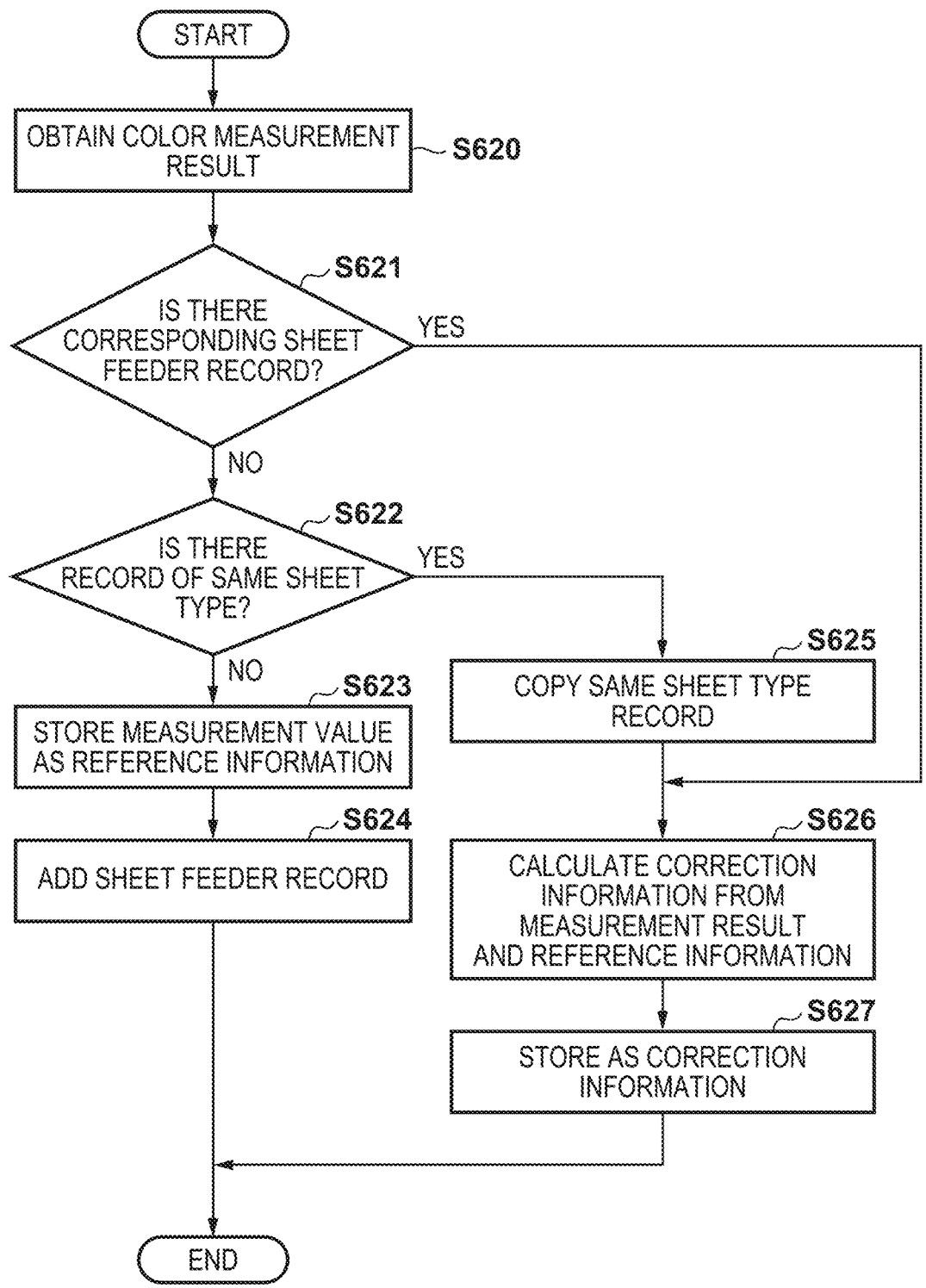
FIG. 6B is a flowchart for describing the processing to register the reference information and the correction information for each sheet type executed by the printing apparatus according to the embodiment.

FIG. 6A is a flowchart for describing the processing to clear the reference information and the correction information for each sheet type executed by the printing apparatus 101 according to the embodiment. Also, FIG. 6B is a flowchart for describing the processing to register the reference information and the correction information for each sheet type executed by the printing apparatus 101 according to the embodiment. The processing of both flowcharts is implemented by the CPU 201 of the printing apparatus 101 deploying a program stored in the ROM 202 on the RAM 203 and executing the program.

First, FIG. 6A is a flowchart for describing processing to clear the reference information and the correction information in which, when there is a request to register the sheet feeder and the sheet type selected by the user in step S507 of FIG. 5 as described above, in step S509 and step S510, the CPU 201 functions as the sheet feeder managing module 313.

In step S601, the CPU 201 receives a request to register the sheet feeder and the sheet type selected by the user. Next, the process proceeds to step S602, and the CPU 201 determines whether or not the registration request leads to a change in sheet type. In a case where no change is needed (re-register of the same sheet type), the process ends. On the other hand, when the sheet type needs to be changed, the process proceeds to step S603, and the CPU 201 determines whether a sheet of the same type as the sheet previously set in the sheet feeder set to be changed in step S601 is set in another sheet feeder. Here, in a case where a sheet of the same type as the previous sheet is in another sheet feeder, the process proceeds to step S605, otherwise, the process proceeds to step S604. In step S604, because the pre-change sheet type will not be used in any of the sheet feeders, the CPU 201 deletes the sheet's reference information and the correction information (TBL 881 (FIG. 8BB) and TBL 883 (FIG. 8BC) described below) from the reference information storing module 311 and the correction information storing module 310, and the process proceeds to step S605. In step S605, the CPU 201 deletes the record of the type information of the sheet of the sheet feeder to have its settings changed from a reference information management table and a correction information management table. In this embodiment, records include the items in FIGS. 8BA to 8BC, namely sheet type 891, target sheet feeder 892, reference information (½ speed) 893, reference information (1/1 speed) 894, generated page ID 895, start date and time 896.

FIG. 6B is a flowchart for describing the processing by the reference information storing module 311 and the correction information storing module 310 when a color measurement result notification is received from the color measuring sensor control module 312 in step S424 of FIG. 4 described above.

In step S620, the CPU 201 functions as the reference information storing module 311 and obtains the color measurement result from the color measuring sensor control module 312. Next, the process proceeds to step S621, and the CPU 201 functions as the reference information storing module 311 and determines whether or not a record of the sheet feeder associated with the color measurement result notified of by the color measuring sensor control module 312 is registered in the reference information management table. In a case where no registration is determined, the process proceeds to step S622. In a case where a registration is determined to be present, the process proceeds to step S626.

In step S622, the CPU 201 functions as the reference information storing module 311 and determines whether or not a record of the sheet type associated with the color measurement result notified by the color measuring sensor control module 312 is registered with another sheet feeder by referencing the reference information management table. In a case where no registration is determined, the process proceeds to step S623. In step S623, the CPU 201 functions as the reference information storing module 311 and stores the color measurement result notified by the color measuring sensor control module 312 as the reference information (TBL 881 in FIG. 8BB as described below). Then, the process proceeds to step S624, and the CPU 201 functions as the reference information storing module 311 and adds the record of the sheet feeder associated with the color measurement result notified by the color measuring sensor control module 312 to the reference information management table and executes link processing to reference the reference information stored in step S623. Then, the process ends.

On the other hand, in step S622, in a case where the CPU 201 determines that a record of the sheet type associated with the color measurement result notified by the color measuring sensor control module 312 is registered with another sheet feeder, the process proceeds to step S625. In step S625, the CPU 201 functions as the reference information storing module 311, and copies the record of the type of the same sheet already registered in the reference information management table as a record of the sheet feeder associated with the color measurement result notified of by the color measuring sensor control module 312, in the reference information management table. In this manner, the reference information of the sheet type can be stored. Next, the process proceeds to step S626, and the CPU 201 functions as the reference information storing module 311 and calculates the correction information from the measurement value and the reference information and notifies the correction information storing module 310 of the calculated correction information (TBL 883 in FIG. 8BC as described below). Then, in step S627, the CPU 201 functions as the correction information storing module 310 and stores the contents notified of by the reference information storing module 311 as correction information. Then, the process ends.

FIGS. 7A and 7B are diagrams illustrating examples of screens for registering sheet types with sheet feeders of the printing apparatus 101 according to the embodiment. The screens of FIGS. 7A and 7B will be described with reference to the processing sequence of FIG. 5 described above.

FIG. 7A illustrates a feeder settings screen for the sheet feeders displayed by the UI control module 316. When the user calls up the feeder settings screen in step S501 of FIG. 5, in step S502, the UI control module 316 queries the sheet feeder managing module 313 for the current feeder settings information. Then, in step S503, the result is displayed on the UI screen 700.

The user selects the sheet feeder to set the sheet type via the UI screen 700. In this embodiment, the selection buttons 701 to 704 are allocated corresponding to the four sheet feeders of the printing apparatus 101. After the user selects a specific sheet feeder, in step S504, when a settings button 705 for setting the sheet type is pressed, the list 710 for sheet type of FIG. 7B is displayed (step S505). Note that at the time of FIG. 7A, the sheet feeder corresponding to the settings button 705 is set as A4 size "plain paper 1".

At the list 710 for sheet type, one selection matching the sheet type set/to be set in the sheet feeder selected at the UI screen 700 is selected. In the example of FIG. 7B, a change is being instigated from sheet type "plain paper 1" to "plain paper 3" for the sheet feeder corresponding to the selection button 701 (step S506). Then, when an OK button 708 of FIG. 7B is pressed, the UI screen 700 is returned to. To confirm the change to the sheet type of the desired sheet feeder, the user presses an OK button 706. In response to this, the UI control module 316 notifies the sheet feeder managing module 313 of the user sheet settings (step S507) and performs a registration request.

FIGS. 8BA to 8BC are diagrams for describing information of a management table of the printing apparatus 101 according to the embodiment. This management table stores the print position of the tone correction marks (tone patches) for tone correction, the color sensor for measuring the printed color patches, and signal values from the color sensor and correction information derived from the signal values.

Figure 8A:
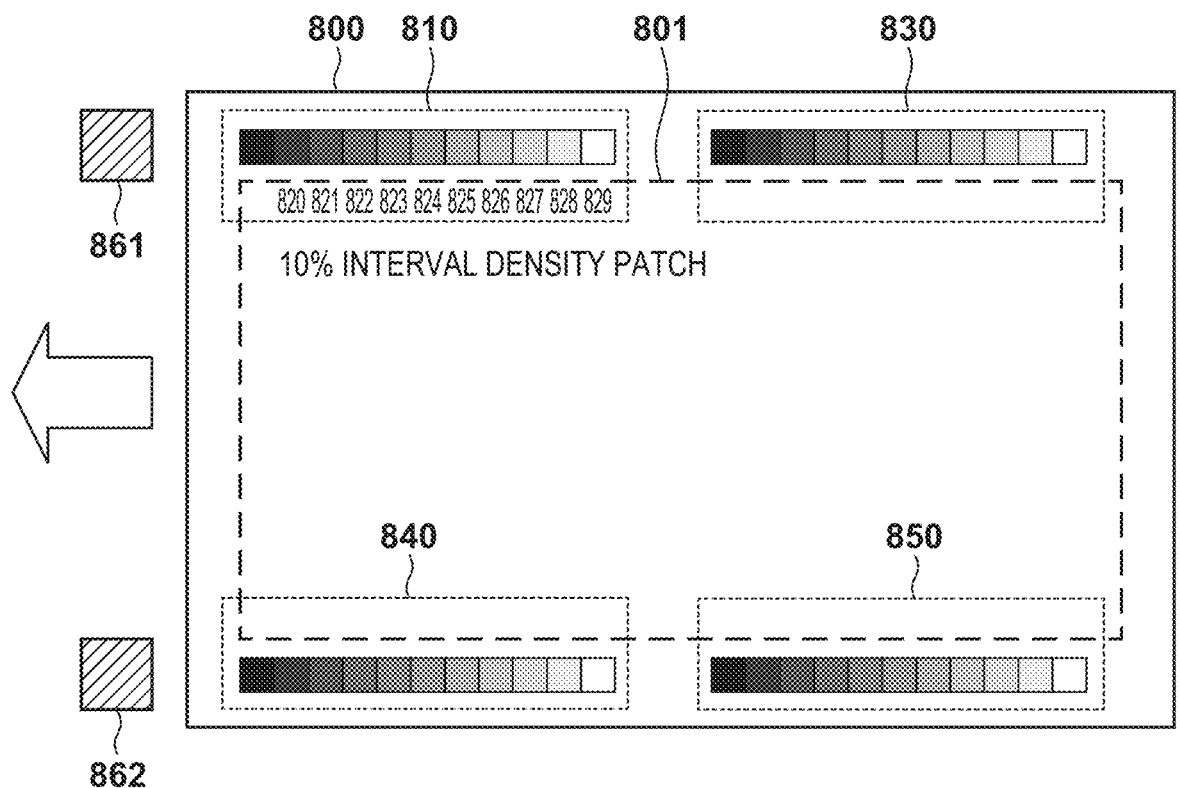
FIGS. 8AA and 8AB are diagrams for describing information of a management table of the printing apparatus according to the embodiment.
Figure 8A:
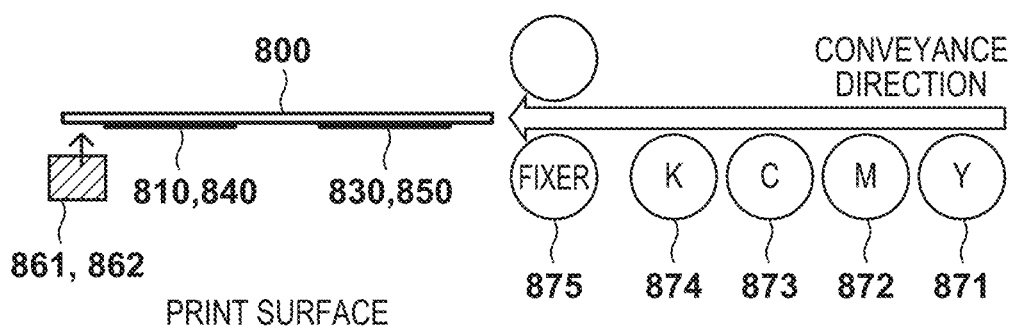

FIG. 8AA is a diagram for describing an output example of tone correction marks (tone patches) targeted for real time tone correction according to the embodiment.

The patches necessary for performing real time multi-tone correction are printed on the inner side of a print sheet 800 and on the outer side of a print assurance region 801 of the print sheet 800 in defined margin areas on both sides. The print assurance region 801 is portion that corresponds to the final product and is a region assured for printing the user image. The area outside of the print assurance region 801 is also an area where an image may be formed, however, this area is intended to be cut or removed from the final product. Note that the area may be used with a Print-on-Demand (POD) device for printing various patches required for image quality adjustment or information required for inspection.

The real time tone correction patches are printed side by side on the outer side of the print assurance region 801 and read by sensors 861, 862 on the print surface side. Thus, the color patches are disposed side by side in the conveyance direction aligned with the position of the sensors 861, 862. Cyan patches 810, magenta patches 850, yellow patches 830, and black patches 840 are printed on the print sheet 800. The patches of each color include ten patches with toner density differing by increments of 10%, and with four colors, a total number of 40 patches are printed.

For example, in the cyan color patches 810, the patch furthest to the left has a density of 100%, and toward the right, the density decreases by increments of 10% (predetermined density unit), with the patch furthest to the right having a density of 10%. Each set of the colors magenta, yellow, and black are made up of ten patches in the same manner. Then, with the data of the reference information and the measurement values of the four colors ready, feedback needed for tone correction can be generated for the first time. The tone correction patches are combined with the image generated by the image generation module 307 by the patch combining module 309.

FIG. 8AB depicts a view illustrating a cross-sectional view, as seen from the side, of the conveyance path of the printing apparatus 101 when printing the patches of FIG. 8AA. Developing devices 871 to 874 of the colors C, M, Y, and K transfer toner to the print sheet 800, before a fixing device 875 executes fixing processing. The patches 810, 830, 840, 850 of each color are read by the color sensors 861, 862 installed on the left and the right at the end in the conveyance direction. The color sensors 861, 862 are installed on the print surface side.

FIG. 8BA is a diagram illustrating an example of the reference information, the measurement values, and the correction information generated on the basis of the CMYK density information scanned by the color sensors 861, 862.

10 patches of each color, C, M, Y, and K, totaling 40 patches are printed on the print sheet 800 of FIG. 8AA. Thus, 40 measurement values are obtained by the color sensors 861, 862 reading the patches. In this example, the color measuring sensor control module 312 stores the patch densities as numerical values of 1024 levels. The color measurement results notified by the color measuring sensor control module 312 are held in the reference information storing module 311 as reference information for each type of sheet set in the sheet feeders. The color measurement results need to be managed per sheet type. In a case where the color measurement results of the sheet notified by the color measuring sensor control module 312 are those of a sheet of a type unregistered in the reference information storing module 311, 40 point color measurement results are stored as new reference information 881 (FIG. 8BA).

On the other hand, in a case where color measurement results of a sheet notified of by the color measuring sensor control module 312 are those of a sheet of a type registered in the reference information storing module 311, the color measurement results are treated as new measurement values 882, and correction information 883 (FIG. 8BA) are calculated from the difference between the reference information and the measurement value. These items of correction information are stored by the correction information storing module 310. Note that in the embodiment, the correction information is stored. However, the measurement values may be stored, and the correction information may be calculated from the difference between the reference information and the measurement values each time it is used.

FIG. 8BB depicts a view illustrating an example of a management table used by the reference information storing module 311 to manage the reference information. The record information of the management table includes the sheet type 891, the target sheet feeder 892, the reference information (½ speed) 893, the reference information (1/1 speed) 894, the generated page ID 895, the start date and time 896. The reference information of the management table indicates that "plain paper 3" is set in "feeder 1 (CST1)", and since the power was turned on at a start date and time of "10:04:06 on 2019 Jul. 18", a printing processing of the 60014th page cumulatively speaking is being executed. At this time, "plain paper 3" is being feed from "feeder 1" at "1/1 speed", and the print result is registered as the color measuring and reference information. Note that in a case where "plain paper 3" is removed from "feeder 1", this record information is deleted.

FIG. 8BC depicts a view illustrating an example of a table used by the correction information storing module 310 to manage the correction information. The basic configuration of this table is the same as the management table of FIG. 8BB, except that the reference information is replaced with the correction information. Also here, in a case where the sheet is removed from the target sheet feeder 897, the record information of the sheet is deleted.

FIG. 9 depicts a view illustrating an example of a table 901 indicating whether the sheet is a large size sheet or a small size sheet.

Indicated in the table 901 is that an A3 sheet is a large size 902 and an A4 sheet is a small size 903. The table 901 is used in determining whether each sheet is a small size sheet or a large size sheet in the processing of combining the tone patches described below.

Figure 10A:
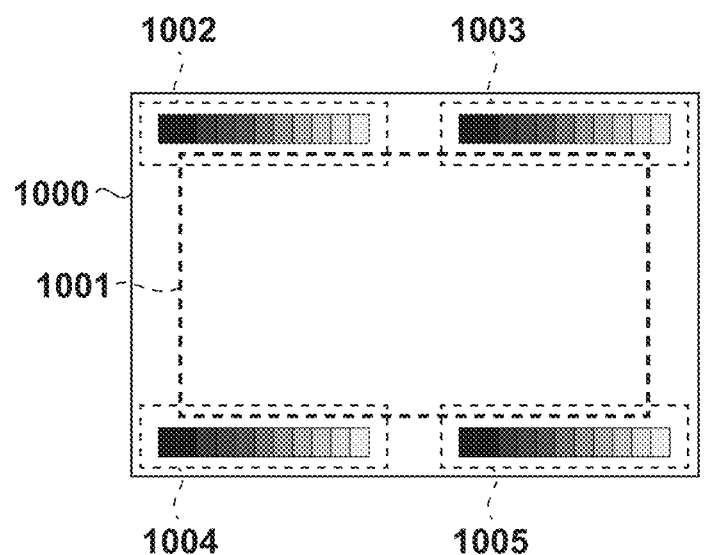
FIGS. 10A and 10B are diagrams illustrating output examples of patches targeted for real time multi-tone correction according to sheet size that are output by the printing apparatus according to the embodiment.
Figure 10B:
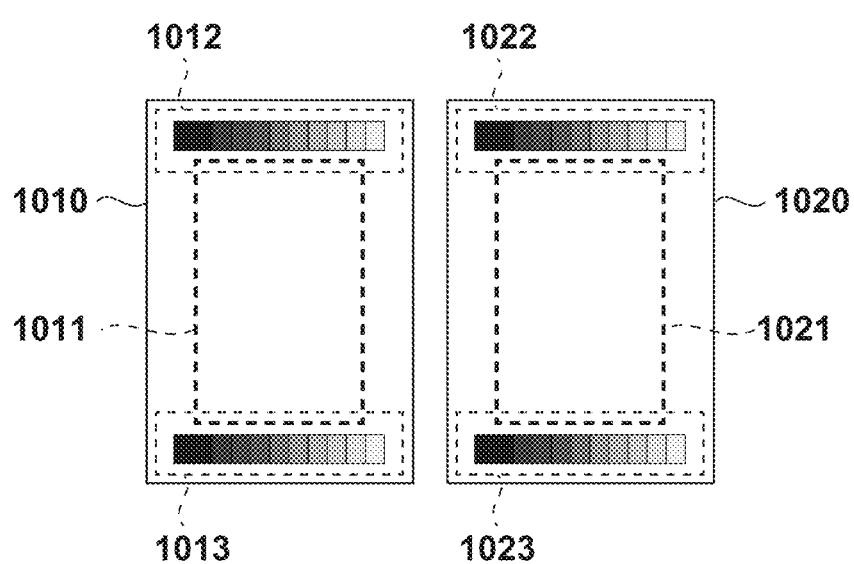

FIGS. 10A and 10B are diagrams illustrating output examples of patches targeted for real time multi-tone correction according to sheet size that are printed by the printing apparatus 101 according to the embodiment.

In order for the inline sensor to accurately read the patches, the size of each of the cyan patches 810, the magenta patches 850, the yellow patches 830, and the black patches 840 illustrated in FIG. 8AA is predetermined. For example, in a case where the size of one patch in the conveyance direction is 11 mm, in order to continuously print ten patches at increments of 10% in terms of toner single color density, the length of a set of color patches needs to be 11 mm multiplied by 10, i.e., 110 mm. Furthermore, as illustrated in FIG. 8AB, in a case where the cyan patches 810 and the yellow patches 830 are disposed along the conveyance direction, the length of two sets of color patches needs to be 220 mm or greater in the conveyance direction. Thus, the printing apparatus 101 needs to perform printing while changing the patch output method depending on the length of the sheet size in the conveyance direction.

FIG. 10A is a diagram illustrating an output example in a case of a sheet size with a sufficient region to form the necessary patches. In this case, as with that of FIG. 8AA, cyan patches 1002, magenta patches 1005, yellow patches 1003, and black patches 1004 including ten patches (10 levels) of 10% increments in toner single color density can be printed on a print sheet 1000, the total number of patches totaling 40.

FIG. 10B is a diagram illustrating an output example in a case of a sheet size with an insufficient region to form the necessary patches. In this case, the patches are printed on two sheets, a print sheet 1010 and a print sheet 1020. A total of 20 patches are printed on the print sheet 1010, with ten patches (ten levels) of cyan patches 1012 and black patches 1013 of 10% increments in toner single color density. Also, a total of 20 patches are printed on the print sheet 1020, with ten patches (ten levels) of yellow patches 1022 and magenta patches 1023 of 10% increments in toner single color density.

The patches for image quality adjustment are patches of each color, cyan, magenta, yellow, and black, and in order to perform adjustment, data of the patches of all the colors must be prepared. In a case where the sheet size has a region sufficient for printing the necessary patches, patch data of all the colors, cyan, magenta, yellow, and black, can be printed on a single sheet. Thus, image quality adjustment can be performed using just one sheet. On the other hand, in a case where the sheet size does not have a region sufficient for printing the necessary patches, for example, cyan and magenta patches are printed on a first sheet and yellow and black patches are printed on a second sheet. In this case, two sheets must be prepared in order to perform color adjustment.

Various pieces of image data are entered by users. For example, a user may enter data that includes both a sheet able to accommodate the patches on a single sheet and a sheet with a size which requires the patches to be printed across a plurality of sheets.

FIGS. 12A to 12C are diagrams illustrating examples of sheets on which patches for real time multi-tone correction have been printed. As illustrated in FIGS. 12A and 12B, in the data, the sheet sizes may all be the same, for example. Or as illustrated in FIG. 12C, in the data, a plurality of sheet sizes may be present. In a case where the data of FIG. 12B is output, because sheets 1211 to 1214 have a size able to accommodate the patches on a single sheet, adjustment can start by just reading a single sheet.

On the other hand, as illustrated in FIG. 12A, because sheets 1201 to 1207 have a size that is unable to accommodate the patches on a single sheet, the patches must be printed divided across two sheets. In this case, adjustment can start when all of the divided patches are read, or in other words, when the patches of the two sheets are read.

In comparison, as illustrated in FIG. 12C, there are cases with a combination of sheet 1221 and 1223 with a size able to accommodate the patches on a single sheet and sheets 1222 and 1224 to 1227 which require the patches to be printed across a plurality of sheets. This case is problematic because correction cannot start until, after the patches of the first sheet is detected, the next second sheet 1224 is read after the second sheet 1222. In a case such as this when an interval exists between the first and second sheets that include a single set of patches, the state of the printing apparatus when printing the subsequent patches changes. Thus, image quality adjustment may be performed using measuring results of incorrect patches.

Figure 11:
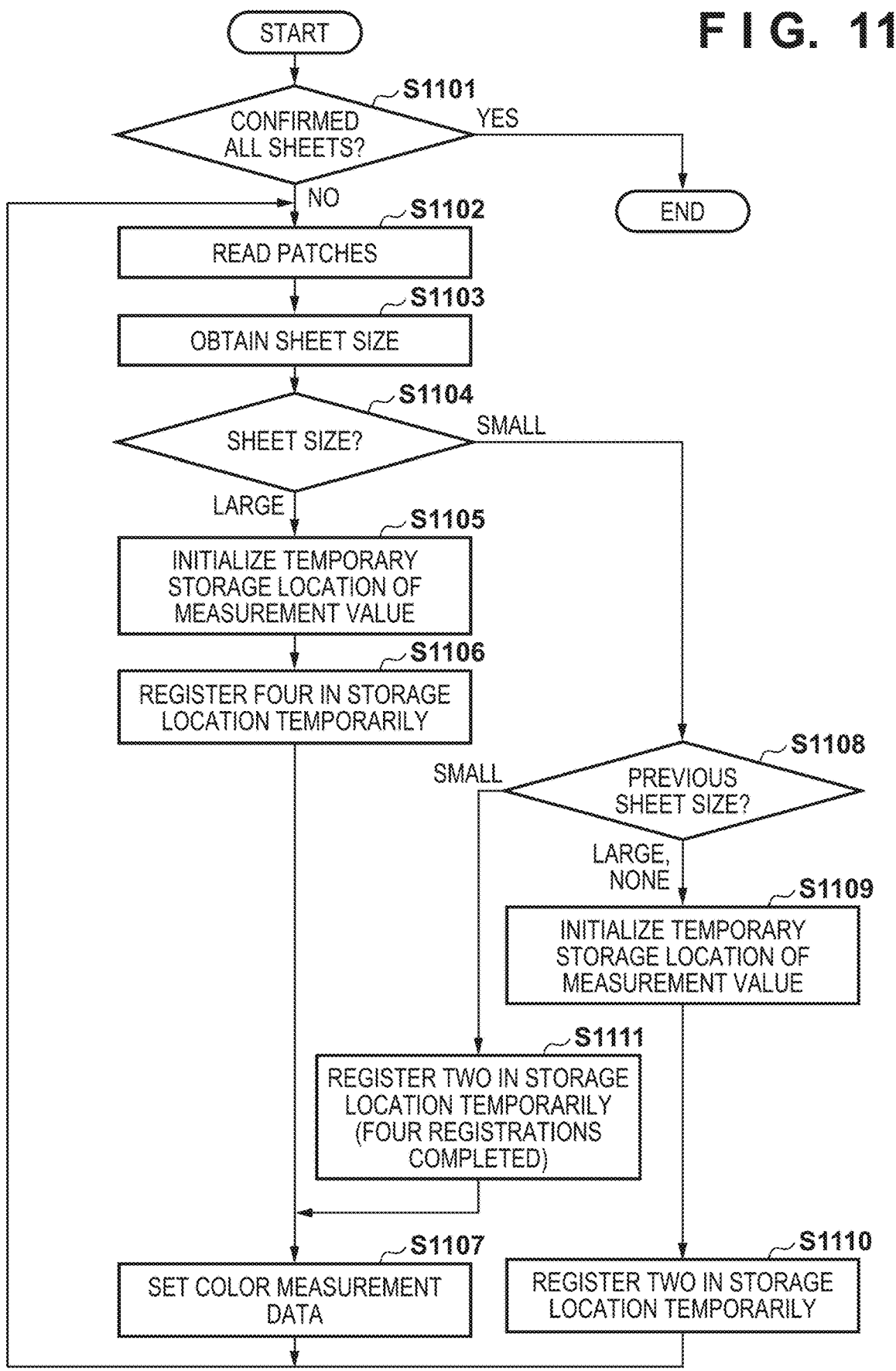
FIG. 11 is a flowchart for describing the processing to determine whether or not to perform real time multi-tone correction using the printing apparatus according to the embodiment.

FIG. 11 is a flowchart for describing the processing to determine whether or not to perform real time multi-tone correction using the printing apparatus 101 according to the embodiment. An example of a case in which four types of patches are required to be read will be described using FIG. 11. The operations of the flowchart are implemented by the CPU 201 deploying a program stored in the ROM 202 on the RAM 203 and executing the program. Herein, the name of the components will be made the subject of the sentences to make clear which component implements the processing.

First, in step S1101, the CPU 201 determines whether reading by the color measuring sensor control module 312 of the color measuring target sheets output (printed) with the received PDL data is complete, or, in other words, whether all of the sheets have been confirmed. In a case where it is determined that confirmation of all of the sheets is not finished, the process proceeds to step S1102. In a case where it is determined that confirmation of all of the sheets is finished, the process ends. In step S1102, the CPU 201 uses the color measuring sensor control module 312 to read the patches from the sheets printed with the received PDL data. Then, the process proceeds to step S1103, and the CPU 201 obtains the sheet size of the sheets read in step S1102 from the engine control module 308. Next, the process proceeds to step S1104, and the CPU 201 determines whether the size of the read sheet is large or small. In this embodiment, large or small is determined in accordance with the table illustrated in FIG. 9. In a case where the read sheet is determined to be sorted into the large sheets, the process proceeds to step S1105. In a case where the read sheet is determined to be sorted into the small sheets, the process proceeds to step S1108.

In step S1105, the CPU 201 initializes a holding unit (provided in the RAM 203 or the storage 204) that temporarily stores the information of the read patches. Then, the process proceeds to step S1106, and the CPU 201 stores the information of the read patches in the holding unit. In this embodiment, four sets of patches are read. Thus, the information of the read patches is used as measurement values to calculate the correction information 883 of FIG. 8BA. Then, the process proceeds to step S1107, and the CPU 201 sets the stored patch information as the color measurement data obtained by the color measuring sensor control module 312. Next, the CPU 201 proceeds the process to step S1102. In this case, by only reading the patches of a single sheet, the required patch information is obtained.

In step S1108, because the sheets were sorted as small sheets, the CPU 201 needs to read the patches on two small sheets. Thus, in step S1108, the CPU 201 determines the size information of the sheet one previous. In a case where the one previous read sheet is a large sheet or no sheet is present, the process proceeds to step S1109. In a case where the one previous read sheet is sorted as a small sheet, the process proceeds to step S1111. In step S1109, the CPU 201 initializes the holding unit that temporarily stores the information of the read measurement patches. Then, the process proceeds to step S1110, and the CPU 201 stores the information of the two sets of read patches in the holding unit. Then, to read the patches of the second small sheet, the process proceeds to step S1102.

In step S1111, in a case where the one previous read sheet and the current read sheet are both small size sheets, the CPU 201 stores the information of the two sets of read patches. In this manner, two small sheets are read one after another and information of the four sets of required patches has been obtained in order to calculate the correction information 883. Then, the process proceeds to step S1107. Then, the CPU 201 sets the stored patch information as the color measurement data obtained by the color measuring sensor control module 312 and proceeds the process to step S1102. In this case, by reading the patches of two sheets one after another, the required patch information is obtained.

Note that in this embodiment, in a case of a large sheet, the color measurement data is set by performing reading just once, and in a case of a small sheet, the color measurement data is set as the measurement value by reading at least two sheets one after another. However, the timing of when the color measurement data is read is not limited to this timing. For example, in other cases, reading may be performed each time in order of a sheet for cyan patches and magenta patches and then a sheet for yellow patches and black patches, in order of a sheet for yellow patches and black patches and then a sheet for cyan patches and magenta patches, or in an order other than this. Also, in a case where two or more sheets need to be measured, processing may be executed when a plurality of sheets can follow one after another. Furthermore, in a case where two or more sheets need to be measured patches, processing may be executed when the sheets able to be used in correction area ready.

Also, in a case where the correction information cannot be obtained because the sheets that need to be measured do not follow one after another, correction may be performed using the most recent correction information or the correction information obtained by measuring the patches of the most recent large sheet.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-109000, filed Jun. 24, 2020, which is hereby incorporated by reference herein in its entirety.

What is claimed is:

1. A printing apparatus comprising:
   a printer engine that prints an image on a sheet;
   a sensor that performs color measuring of tone correction patches printed on a sheet;
   one or more controllers including one or more processors and one or more memories, one or more controllers configured to:
      cause the printer engine to print first tone correction patches of a first color on a predetermined size of a first sheet and to print second tone correction patches of a second color being different from the first color on a predetermined size of a second sheet;
      generate correction information based on a color measurement result of the first tone correction patches and the second tone correction patches printed on the first sheet and the second sheet, respectively, as measured by the sensor; and
      correct image data using the correction information,
   wherein, in the generation of the correction information, in a case where there are more than a predetermined number of sheets of a size being different from the predetermined size between the first sheet and the second sheet, the one or more controllers do not generate the correction information using the color measurement result of the first tone correction patches and the second tone correction patches.

2. The printing apparatus according to claim 1, wherein, in the generation of the correction information, in a case where there are not more than the predetermined number of sheets of a size being different from the predetermined size between the first sheet and the second sheet, the one or more controllers generate the correction information using the color measurement result of the first tone correction patches and the second tone correction patches.

3. The printing apparatus according to claim 1, wherein the predetermined size is A4 size.

4. The printing apparatus according to claim 1, wherein the size being different from the predetermined size is A3 size.

5. The printing apparatus according to claim 1, wherein the one or more controllers further cause the printer engine to print third tone correction patches of a third color on the first sheet and to print fourth tone correction patches of a fourth color on the second sheet.

6. The printing apparatus according to claim 1, wherein, in the generation of the correction information, in a case where there are a number of sheets between a third sheet and a fourth sheet whose sizes are different from the predetermined size, the one or more controllers generate the correction information regardless of the number of sheets.

7. The printing apparatus according to claim 1, where the tone correction patches are printed on sheets of a plurality of sizes.

8. The printing apparatus according to claim 1, where the plurality of sizes include A4 size and A3 size.

9. A method of controlling a printing apparatus having a printer engine that prints an image on a sheet and a sensor that performs color measuring of tone correction patches printed on a sheet, the method comprising:
   causing the printer engine to print first tone correction patches of a first color on a predetermined size of a first sheet and to print second tone correction patches of a second color being different from the first color on a predetermined size of a second sheet;
   generating correction information based on a color measurement result of the first tone correction patches and the second tone correction patches printed on the first sheet and the second sheet, respectively, as measured by the sensor; and
   correcting image data using the correction information,
   wherein, in the generation of the correction information, in a case where there are more than a predetermined number of sheets of a size being different from the predetermined size between the first sheet and the second sheet, the correction information is not generated using the color measurement result of the first tone correction patches and the second tone correction patches.

10. The method of controlling the printing apparatus according to claim 9, wherein, in the generation of the correction information, in a case where there are not more than the predetermined number of sheets of the size being different from the predetermined size between the first sheet and the second sheet, the correction information is generated using the color measurement result of the first tone correction patches and the second tone correction patches.

11. The method of controlling the printing apparatus according to claim 9, wherein the predetermined size is A4 size.

12. The method of controlling the printing apparatus according to claim 9, wherein the size being different from the predetermined size is A3 size.

13. The method of controlling the printing apparatus according to claim 9, further comprising:
causing the printer engine to print third tone correction patches of a third color on the first sheet and to print fourth tone correction patches of a fourth color on the second sheet.

14. The method of controlling the printing apparatus according to claim 9, wherein, in the generation of the correction information, in a case where there are a number of sheets between a third sheet and a fourth sheet whose sizes are different from the predetermined size, the correction information is generated regardless of the number of sheets.

15. The method of controlling the printing apparatus according to claim 9, where the tone correction patches are printed on sheets of a plurality of sizes.

16. The method of controlling the printing apparatus according to claim 9, where the plurality of sizes include A4 size and A3 size.

17. A non-transitory computer-readable storage medium storing a program for causing a processor to execute a method of controlling a printing apparatus having a printer engine that prints an image on a sheet and a sensor that performs color measuring of tone correction patches printed on a sheet, the method comprising:
causing the printer engine to print first tone correction patches of a first color on a predetermined size of a first sheet and to print second tone correction patches of a second color being different from the first color on a predetermined size of the second sheet;
generating correction information based on a color measurement result of the first tone correction patches and the second tone correction patches printed on the first sheet and the second sheet, respectively, as measured by the sensor; and
correcting image data using the correction information,
wherein, in the generation of the correction information, in a case where there are more than a predetermined number of sheets of a size being different from the predetermined size between the first sheet and the second sheet, the correction information is not generated using the color measurement result of the first tone correction patches and the second tone correction patches.

* * * * *